United States Patent

[11] 3,541,946

| [72] | Inventor | Ronald M. Johnston<br>Crystal Lake, Illinois |
|---|---|---|
| [21] | Appl. No. | 728,583 |
| [22] | Filed | May 13, 1968 |
| [45] | Patented | Nov. 24, 1970 |
| [73] | Assignee | The Quaker Oats Company<br>Chicago, Illinois<br>a corporation of New Jersey |

[54] APPARATUS FOR CONTINUOUSLY PRODUCING A CENTER FILLED PUFFED CEREAL PRODUCT
3 Claims, 14 Drawing Figs.

[52] U.S. Cl. .................................................. 99/238,
:22/129; 107/1
[51] Int. Cl. ...................................................... A23l 1/18
[50] Field of Search ........................................... 99/238,
237, 238.4, 238.5, 238.6, 238.7; 107/1, 14, 14.1,
14.4, 14.5; 18/12, 13, F, P, 14; 431/284, Inq;
239/423, 424, Inq; 222/129; 25/8; 425/205

[56] References Cited
UNITED STATES PATENTS

| 2,379,161 | 6/1945 | Kraps | 239/424X |
|---|---|---|---|
| 2,919,836 | 1/1960 | Limpert | 239/424X |
| 3,066,874 | 12/1962 | Becker | 239/424X |
| 3,222,721 | 12/1965 | Reynolds | 18/13P |
| 3,241,503 | 3/1966 | Schafer | 107/1 |
| 3,291,032 | 12/1966 | Graves | 99/238 |

FOREIGN PATENTS

| 550,098 | 10/1956 | Italy | 425/205 |

*Primary Examiner*—Walter A. Scheel
*Assistant Examiner*—Leon G. Machlin
*Attorneys*—Milton C. Hansen and Donnie Rudd ABSTRACT: A quick takedown apparatus for continuously producing a center-filled puffed cereal product. The center-filled die and the cereal dough die around it are maintained in proper alignment by concentric pilot surfaces on an inner and outer die assembly. In a preferred device a center-fill material is admitted to a removable inner die by way of a circumferential channel around the inner die which connects by conduit means to the hollow interior of the center-fill die.

Patented Nov. 24, 1970
3,541,946
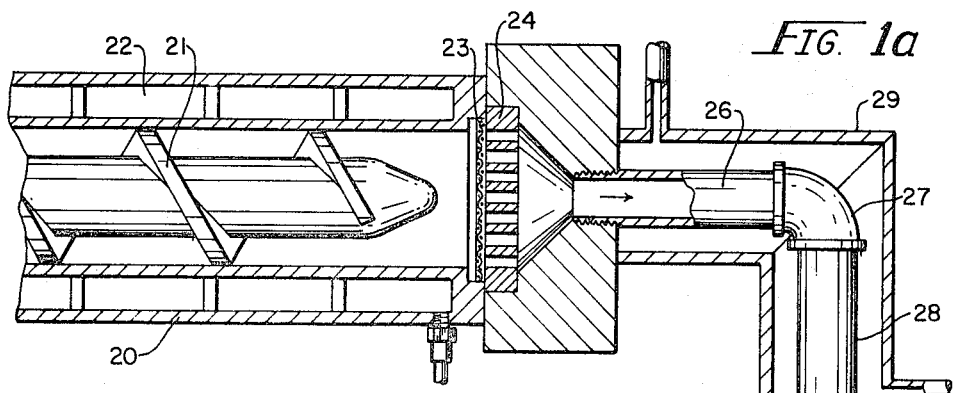
FIG. 1a
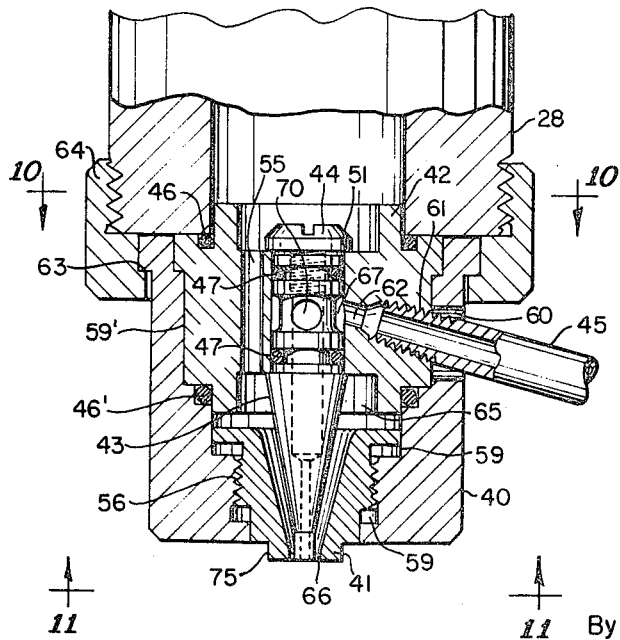
FIG. 1b
FIG. 2
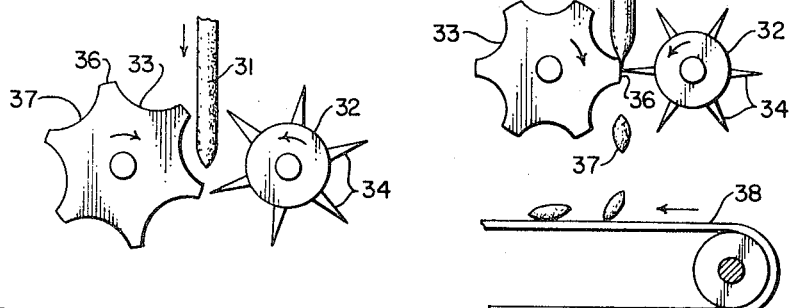
FIG. 1c
INVENTOR:
RONALD M. JOHNSTON
By Donnie Rudd
agent

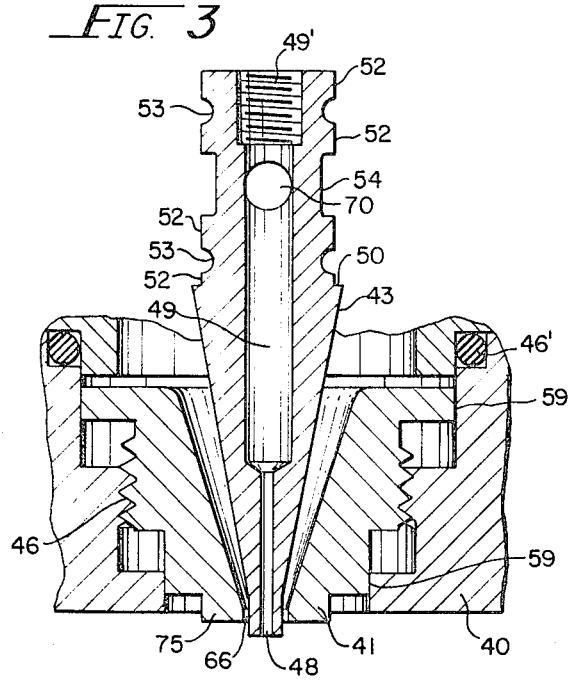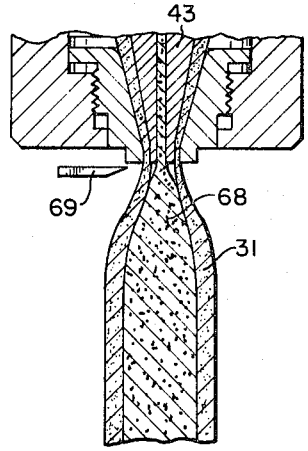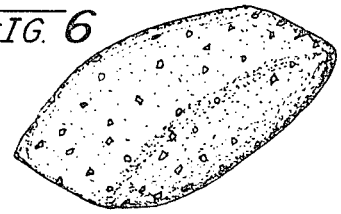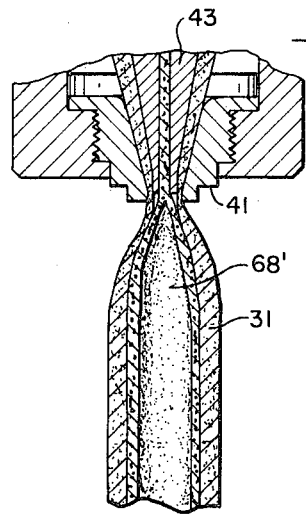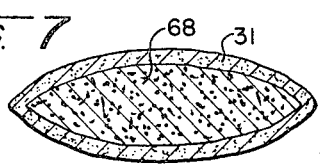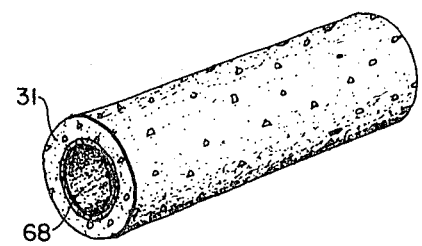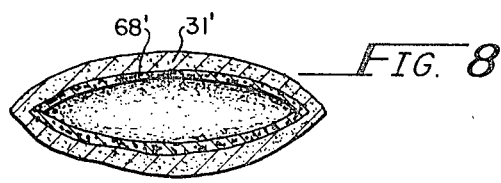
INVENTOR:
RONALD M. JOHNSTON
By Donnie Rudd
agent

INVENTOR:
RONALD M. JOHNSTON

By  Donnie Rudd

AGENT 3,541,946

1

APPARATUS FOR CONTINUOUSLY PRODUCING A CENTER FILLED PUFFED CEREAL PRODUCT

BRIEF SUMMARY OF THE INVENTION

This invention relates to the art of continuously manufacturing a puffed or expanded cereal shell and simultaneously center filling the expanded cereal food shell. When cereal doughs are extruded under expanding conditions the sudden release of pressure at the die permits the release of steam throughout the extruded dough mass and the dough mass instantaneously acquires a greatly expanded volume. This continuous action at the die orifice is a violent action. This action, and the high pressures involved in manufacture of such products make center filling of a tubular extrudate very difficult, particularly if a thin cereal shell is desired. Furthermore because of the necessary very close clearance between an inner die and the outer die such extrusion heads are subject to clogging as the result of accumulation of relatively small bits or pieces of particulate matter such as overdone cereal fragments.

It is therefore an object of this invention to provide an extrusion apparatus for continuously producing center-filled expanded cereal food products which is readily taken apart for cleaning and yet which maintains the precise clearance between the inner and outer dies which are necessary for the production of a uniform thin expanded cereal shell.

BRIEF DESCRIPTION OF THE DRAWINGS

FIG. 1a is a schematic view showing the apparatus for carrying out the overall process.

FIG. 1b and FIG. 1c are schematic views showing the action of the rotating cutting system.

FIG. 2 is an enlarged cross-sectional view of a preferred form of the extruding head of this invention.

FIG. 3 is a further enlarged cross-sectional view showing in particular the inner die, and a slightly changed position of the outer die around the inner die.

FIGS. 4 and 5 are enlarged cross-sectional views showing approximate flow of patterns of the extrudate.

FIG. 6 is a perspective view of a preferred form of the final product.

FIG. 7 is a cross-sectional view of a preferred form of the final view in which the entire interior portion of the cereal food product is filled.

FIG. 8 is a cross-sectional view of a preferred form of a product in which the bulk of the inner portion of the product is unfilled but the cereal shell is coated on the inside.

FIG. 9 is a perspective view of another form of the product of this invention.

DESCRIPTION OF PREFERRED EMBODIMENT

Figure 10:
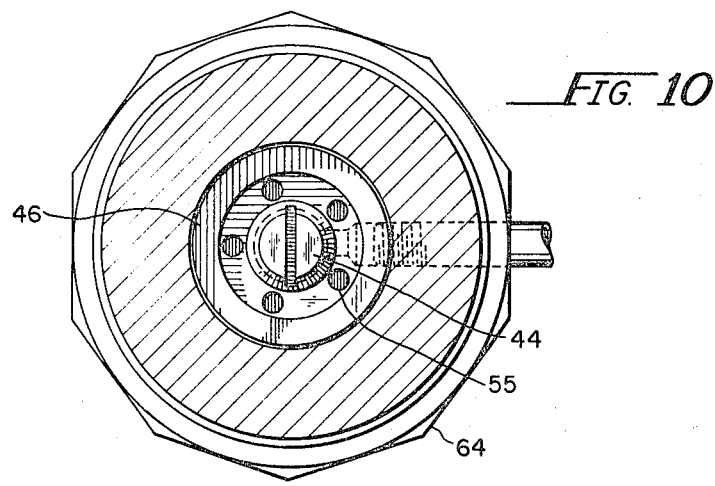
FIG. 10 is a top view of an assembled extrusion head.

In FIG. 1 the discharge end portion of an extruder is shown at 20. The rotating screw conveyor 21 is enclosed within a jacket 22 through which a heated medium such as steam may be circulated. The rotating screw 21 preferably has a compression ratio of preferably 3 or 4 to 1 and the compression of the moist cereal mixture increases the heat transferred to the mixture and subjects the dough being formed to vigorous working at high rates of shear. Additional heat is supplied by the presence of steam in the jacket 22 of the extruder.

At the exit end of the extruder a screen pack 23 of one or more screens of 40 mesh to 14 mesh may be provided for preventing foreign material or nonplasticized material from passing to the extrusion die, and for increasing back pressure in the extruder. Also a breaker plate 24 having a plurality of holes one-eighth inch in diameter may be mounted behind the screen pack 23 to increase the shearing action and further increase the back pressure. The use of a screen pack and breaker plate at the exit end of the extruder for plastic material is well known.

The dough is forced by the screw through the screen pack into the horizontal pipe 26 and through elbow 27 and vertical pipe 28 at the bottom of which is located the extruder head 30 to which this invention pertains. The conveying pipes 26, 27 and 28 are preferably jacketed as illustrated in FIG. 1a by the steam jacket 29 to maintain the dough at a desired temperature. Upon its discharge from the orifice of the die 41 the hot dough 31 immediately undergoes a large increase in its volume and for a fraction of a second it remains plastic and has a high degree of adhesive and cohesive character. The expanded dough is cut during the moments while it remains in this plastic, adhesive condition, into segments of the desired length. The device for cutting the dough may be a knife 69 as illustrated in FIG. 4, or it may be a pair of rolls indicated at 32 and 33, in FIG. 1a, the roll 33 being an anvil roll, and the roll 32 having radially extending knives 34 spaced apart circumferentially a distance equal to the desired length of the cutoff pieces. As the expanded dough passes between the rolls 32 and 33 as shown in FIG. 1b the recessed portions 37 of the anvil roll permit the dough 31 to move freely into the nip between the rolls, as illustrated. The rolls 32 and 33 move in a timed relation to one another so that an elevated surface 36 of the anvil roll is directly opposed by a corresponding knife blade 34, as illustrated in FIGS. 1c and 1a, so that the dough is first pinched together as it moves into the nip between the rolls and is then cut into a separate segment 37. By crimping in this manner while the expanded or puffed dough is still in its plastic, adhesive condition, both sides of the shell are brought into contact with each other to adhere to each other and seal the shell. The resulting segments 37 can then be dropped onto a conveyor 38 and moved through a drying oven which is not shown since it constitutes no part of the invention.

FIG. 2 shows a preferred form of the extruder head of this invention which is made up of the following major parts: the outer die holder 40 and the outer die 41, the inner die holder 42 and inner die 43 and the inner die securing screw 44, the lateral center-fill feed tube 45, the inner die holder seals 46 and 46' and the inner die seals 47. FIG. 3 shows further enlarged cross-sectional view of the inner die 43. The die is shown to have a relatively thick upper portion and a relatively narrow lower portion. The entire center of the die pin 43 is hollow to provide the conduit 49 through which the center-filled material is conveyed to the inner die orifice 48. The upper portion of the hollow interior of the center die is threaded 49' to receive the inner die securing screw 44 shown in FIG. 2. When the inner die 43 is positioned in the inner die holder 42 the shoulder 50 of the inner die indicated in FIG. 3 abuts against the lower surface of the inner die holder 42. This prevents further penetration of the inner die as is apparent in FIG. 2 and the inner die is then secured by the securing screw 44 the head of which abuts against an upper surface 51 of the inner die holder 42. The bearing or pilot surfaces 52 indicated in FIG. 3 fit closely inside the inner die holder 42 to provide vertical stability. The recesses 53 shown within these bearing or pilot surfaces receive the sealing means, preferably an O-ring, 47. Located between the two sets of the bearing surfaces is a circumferential groove or recess 54 which forms channel 67. Also a hole 70 passing through the entire inner die, the channel 67 around the inner die, and the conduit 62 permits the center-fill material to pass from the lateral feed tube 45 through the hole 70 into the interior conduit 49 to the inner die orifice 48. The securing screw 44 prevents the passage of the center-filled material out of the upper end of the inner die.

Figure 11:
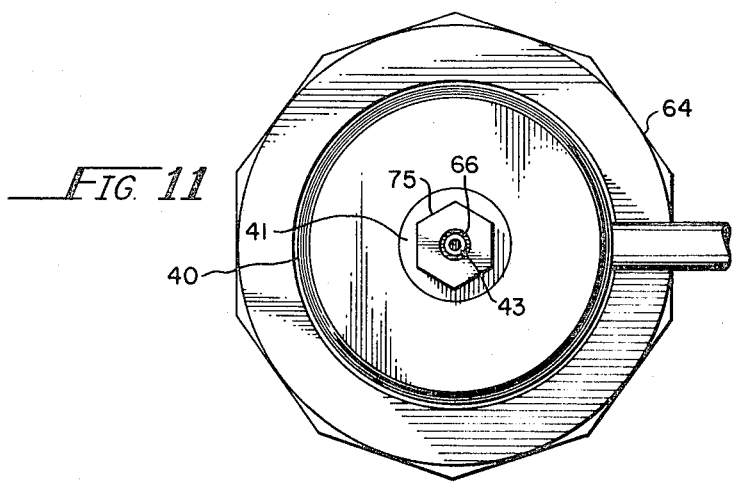
FIG. 11 is a bottom view of an assembled extrusion head.

As seen in FIG. 2 and in FIG. 10, the inner die holder 42 contains several passages 55 situated around the securing screw 44 which permits the dough to pass through to the bottom of the inner die holder independently of the inner die. The inner die holder 42 into which is secured the inner die with the inner die seals 47 and the inner die securing screw 44 may be referred to for convenience as an inner die assembly. The outer die 41 illustrated in FIG. 2 is placed in the outer die holder 40 from the top and is threaded to the desired depth by rotation of the outer die. The presence of the threads 56 as shown in FIG. 2 and of the flat hexagonal vertical surfaces 75, see FIG. 11, permit convenient rotation and depth adjustment of the outer die when the extrusion head is completely assembled and in operation. Bearing or pilot surfaces 59 at the top and bottom of the outer die provide proper alignment of the outer die within the outer die holder. After positioning of the inner die seal 46', the inner die assembly is fitted into the outer die holder above the outer die. The close clearance between the bearing or pilot surfaces at 59' provide proper alignment of the inner die assembly within the outer die holder and consequently also provides proper alignment of the inner die within the outer die. At this point in assembling the extrusion head of this invention the inner die assembly may be rotated within the outer die holder. The inner die assembly is rotated if necessary to permit the lateral feed tube 45 to be passed through the opening 60 of the outer die holder and to be fastened to the inner die holder by means of the threads 61 and 61'. The actual attachment of the lateral feed tube 45 is usually performed after the extrusion head is completely assembled as outlined above, and after the extrusion head is fastened to the extruder discharge pipe 28. The extrusion head may be fastened to the end of the dough pipe 28 by means of a flange 63 on the outer die holder and a securing nut 64.

OPERATION OF THE EXTRUSION HEAD

Hot moist cooked dough under pressure within pipe 28 flows through the channels 55 in the inner die holder into the space 65, 65' surrounding the lower portion of the inner die and thence to the fine orifice 66, 66' between the outer and inner die. Simultaneously a viscous fluid 68 also under pressure is introduced to the extrusion head through the lateral feed pipe 45 which passes through the inner die holder, and channel 62 into the space 67 formed by the recessed portion 54 of the inner pin, and thence through the hole 70 into the conduit 49 and out the orifice 48 of the inner die. It is noted that in FIGS. 2 and 4 the outer die adjustment is such that the bottom of the outer die is in the same horizontal plane as the bottom of the inner die.

FIG. 4 shows the stream of dough 31 and a stream of center-fill material 68 being extruded from the apparatus of this invention. The rate of flow of the center-fill fluid is sufficiently high in FIG. 4 to completely fill the interior formed by the expansion of the dough 31. In FIG. 3 the outer die has been rotated so that the bottom of the inner die is substantially lower than the bottom of the outer die. In FIG. 5 the bottom of the outer die 41 is adjusted to be substantially lower than the bottom of the inner die 43. The adjustment illustrated in FIG. 5 is preferred for use in simply coating the inside of the extrudate. In this use of my apparatus a reduced flow, i.e. a small proportion, of center-fill material such as chocolate contacts the dough while the dough is still under substantial pressure within the outer die, and upon the expansion of the cereal dough the soft center-filled material 68' simply coats the interior of the expanded cereal shell 31' as illustrated in FIG. 8. The structure resulting after cutting with equipment illustrated in FIG. 1a are pieces resembling that shown in FIG. 6 and 8. If the extrudate is cut by means of a knife 69 which moves quickly across the face of the die (instead of being cut by a rotary knife system 32—33) an open ended product results which is similar to that shown in FIG. 9.

Figure 12:
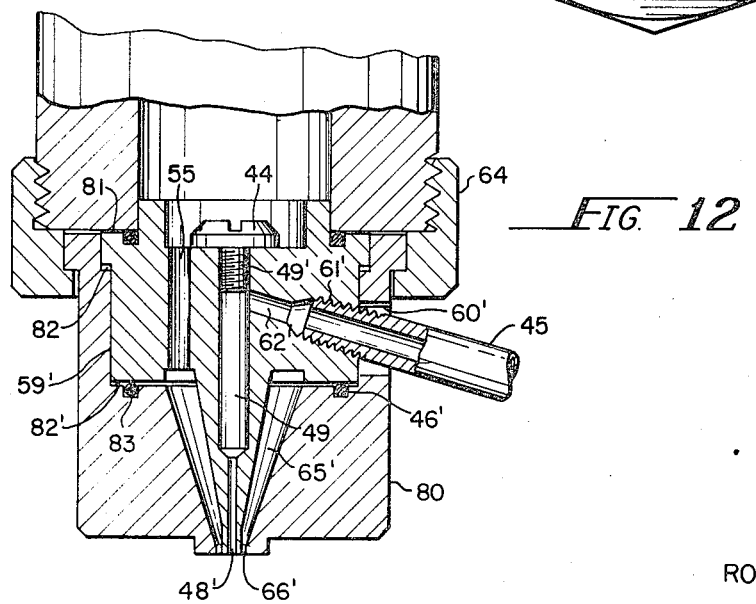
FIG. 12 is an enlarged cross-sectional view of an alternative embodiment of my extrusion head.

FIG. 12 shows an alternative embodiment of my invention. The principal parts are the outer die assembly 80 and the inner die assembly 81. The inner die assembly 81 is held in proper alignment within the outer die 80, by close clearance at pilot surfaces 59'. The outer pilot surface of the inner die and the inner pilot surface of the outer die are concentric cylindrical surfaces, the center line of which goes through the center of the orifice 48 through which the center-fill extrudate flows, and of the orifice of the outer die 66'.

I prefer that there be sufficient clearance at the shoulders 82, 82' to permit compression of the O-ring seal means shown at 83.

The center of the inner die assembly 81 is hollow to provide a conduit 49 through which the center-fill material is conveyed to the orifice 48'. The upper portion of the hollow is threaded 49', to receive the sealing screw 44. Removal of the screw 44 facilitates cleaning of the conduit 49.

The inner die assembly 81 also has a plurality of passages 55' located around the securing screw 44 (as shown in FIG. 10) to permit dough to flow through the inner die assembly to the channel 65' between the inner and outer die.

The lateral feed tube 45' passes through the opening 60' in the outer die 80 and is secured in the inner die assembly by threads 61'. The conduit 62' permits passage of center-fill material to the center conduit 49 of the inner die.

It will be apparent that the extrusion head disclosed herein provides many advantages not theretofore available to the art. It permits maintenance of extremely close clearance between the inner and outer dies, yet it permits joining of two fluid streams which are under high pressure while one of the streams is undergoing violent expansion. The apparatus is quickly taken down for cleaning and every portion of the apparatus is readily available for cleaning when taken down. While the threaded feature 56 is not an essential one the presence of this feature permits adjustment of the channel clearance between the inner and outer die while the apparatus is in use i.e. without disassembling the apparatus. However, no change in the orifice size is accomplished by such adjustment. Furthermore, rotation of the die in and out while the apparatus is in use helps clear the orifice and channel between the inner and outer dies of particulate matter inadvertently lodged therein.

It will be appreciated by one skilled in the art that the disclosed invention permits some flexibility without departing from the invention. The outer die inside dimension at the orifice can be varied considerably. For example, preferred sizes run from .10 to .30 inches. The outside dimension of the inner die at the orifice can also be varied. For example, preferred dimensions run from .070 to .027 inches. It is noted, therefore, that the preferred orifice clearances between the outer and inner die ranges from .030 to .270 inches. Hence, considerable variation can be achieved in size of extrudate piece as well as in thickness of the extrudate shell.

Generally I prefer openings in the center-fill die, i.e. inner die, to range from .020 to .180 inches. Naturally larger or smaller dimensions may be used in the dies depending on the nature of the extrudates and type of product desired.

Also, I prefer the clearance between the pilot surfaces 59 to be between .0005 and .0010 inches. With clearances this close, there is no need for seals. I prefer the clearances between the pilot surfaces at 59' to be between .0015 and .0025 inches, because the longer length of the line shown permits such relatively large clearance for a similar degree of vertical alignment. Also, the last mentioned relatively large clearances facilitate removal of the inner die for cleaning purposes. As shown, I prefer the use of seals as the O-rings shown at 46—46'—47, whenever such larger clearances are used, to prevent substantial penetration of dough between the opposed pilot surfaces, since such penetration causes the pieces to become "cemented" together.

Also, considerable variation may be used in the dimension of the length of the final channel at the orifice of the dies. This length is known in the art as "land". The length of this final channel helps in the actual shaping of the extrudate. Land lengths of from .050 to .400 inches are imminently satisfactory for use in this invention depending on the amount of shaping required, and on the width of the orifice required. More shaping and wider orifice dimensions require longer land lengths. The minimum land length is usually set by safety considerations, since the front section of a die must be of sufficient thickness to contain the pressures encountered in the operation of the system. Generally, pressures encountered run from about 1,000—4,000 pounds.

I Claim:

1. An apparatus for producing center-filled expanded cereal food products by extrusion comprising:
   an outer die holder;
   an inner die;
   an inner die holder;
   an outer die;
   an inner die securing screw; and
   a lateral feed tube;
   the outer die holder having a first and second concentric circular vertical pilot surfaces, said first surface being adapted for closely receiving the outer die and for maintaining said outer die in precisely vertical alignment, and said second surface being adapted for closely receiving said inner die holder, and for maintaining the inner die holder in a precisely vertical alignment, said outer die holder having an opening for passage of said lateral feed tube therethrough; said outer die having outer pilot surfaces, herein referred to as the third pilot surfaces, for closely engaging the first pilot surface, and an inner surface defining the outer boundaries of a cavity in which the lower part of the inner die is positioned, said inner die forming the inner boundary of a conduit through which dough may pass, and be discharged at an orifice defined by the lower extreme of the inner surface of the outer die, and the inner die; the inner die holder having concentric circular outer and inner pilot surfaces, hereinafter referred to as fourth and fifth pilot surfaces respectively, said fourth surface closely fitting within the outer die holder's second pilot surface, and means for receiving the lateral feed tube and means for connecting said tube to the central portion of the fifth pilot surface, said inner die holder also containing vertical conduit means for permitting fluid dough to pass through the inner die holder independently of the inner die, and for discharging the dough below the inner die holder between the inner die and outer die; the inner die comprising a hollow pin extending generally from the top of the inner die holder to the bottom of the outer die, the upper portion of the pin being engaged by the inner die holder, the lower portion defining the inner limit of a conduit channel between the outer and inner dies, the upper portion of the inner die having circular outer pilot surfaces hereinafter called sixth pilot surfaces for closely fitting into the fifth pilot surface, said sixth pilot surfaces contacting the upper and lower extremes of the fifth pilot surface, said sixth pilot surfaces being spaced apart from each other by a circumferential groove and conduit means or connecting the lateral feed tube to the hollow inner portion of the inner die, said inner die having a horizontal shoulder which engages the bottom horizontal surface of the inner die holder, thereby arresting further vertical insertion of the inner die into the inner die holder, said inner die having a threaded section in the upper extremes of its hollow, said inner die being held within the inner die holder by a threaded inner die securing screw, and the lower portion of the inner die being tapered towards a relatively narrow termination; said first, second, third, fourth, fifth, and sixth pilot surfaces being concentric; whereby the lowermost end of the inner die is held securely and precisely within the orifice of the outer die, whereby dough under pressure above the inner die holder flows in the separate conduit means around the inner die thence between the outer and inner die and finally expands out the orifice of the outer die, and simultaneously the center-fill fluid, also under pressure, is conveyed from the side of the die extrusion head through the outer and inner die holders, around the inner die in the groove, thence through the hollow of the pin to be discharged within the dough being expanded out of the outer die orifice.

2. An extrusion head apparatus comprising:
   an outer die holder, having first and second concentric receiving portions;
   an outer die;
   an inner die holder;
   an inner die;
   an inner die securing screw; and
   a lateral feed conduit means;
   The outer die fitting snugly into the first receiving portion of the outer die holder, the inner die holder fitting snugly into the second receiving portion of the outer die holder, and the inner die being held snugly by the inner die holder, the unit consisting of the assembled inner die and inner die holder being referred to as the inner die assembly; said first and second concentric receiving portions being so oriented that when the outer die and the inner die assembly are in their respective receiving portions of the outer die holder, the inner die is held within and spaced apart from the outer die inner surface, thereby forming a dough channel therebetween; the outer and inner die holders containing means for passing the lateral feed conduit means therethrough to the inner die; the inner die comprising a pin which is hollow throughout its length, said inner die having a relatively wide upper portion and a relatively narrow lower portion, the wide upper portion fitting snugly into the inner die holder, and containing a circumferential groove into which the lateral feed tube conduit means empties, said groove being connected by a second conduit means to the hollow inside of the inner die, said inner die fitting into the bottom of the inner die holder and extending substantially through the inner die holder, and being secured therein by a shoulder on the pin which engages the bottom of the die holder, and by a securing screw, the threaded portion of which engages a threaded section in the top of the hollow portion of the inner die, the head of said securing screw engaging the top of the inner die holder, the securing of the inner die within the inner die holder resulting in the inner die assembly; the inner die holder containing vertical conduit means for channeling fluid dough from above the extrusion head independently of the inner die, into the dough channel between the outer and inner die.

3. An extrusion head apparatus for use with an extruder to continuously produce an expanded, center-filled cereal product comprising:
   A. an outer die component comprising:
      1. a discharge opening;
      2. an interior cylindrical pilot surface;
      3. first lateral conduit means for conveying fluid material from outside the extrusion head to the interior of the outer die component;
      4. means for securing the extrusion head apparatus to an extruder;
   B. an inner die component which includes:
      1. a discharge opening;
      2. an inner channel for conveying fluid to the discharge opening;
      3. means for closing the inner die channel at the extruder end of the inner die component;
      4. second lateral conduit means for conveying fluid from the first lateral conduit means to the inner channel of the inner die component; and,
      5. an outer cylindrical pilot surface; said inner die component being secured within the outer die component, said outer cylindrical pilot surface closely fitting within said interior cylindrical pilot surface, the discharge opening of the inner die component being within the discharge opening of the outer die component, the first lateral conduit means and the second lateral conduit means being threadably connected so as to be hydraulically continuous, and being located to pass through the cylindrical pilot surfaces; and,
   C. means for conveying cooked dough from an extruder to the discharge opening of the outer die component.